(12) United States Patent
Helm et al.

(10) Patent No.: US 11,053,971 B2
(45) Date of Patent: Jul. 6, 2021

(54) NUT INTEGRITY MONITORING DEVICE AND METHOD

(71) Applicant: Weidmüller Interface GmbH & Co. KG, Detmold (DE)

(72) Inventors: Peter Helm, Detmold (DE); Franz-Josef Bergmann, Steinheim (DE); Hans Schlingmann, Horn-Bad Meinberg (DE); Christian Heggemann, Detmold (DE); Steffen Niggemann, Winterberg (DE); Dirk Bauerkämper, Lage (DE)

(73) Assignee: Weidmüller Interface GmbH & Co. KG

( * ) Notice: Subject to any disclaimer, the term of this patent is extended or adjusted under 35 U.S.C. 154(b) by 281 days.

(21) Appl. No.: 16/314,254

(22) PCT Filed: Jun. 20, 2017

(86) PCT No.: PCT/EP2017/065075
§ 371 (c)(1),
(2) Date: Dec. 28, 2018

(87) PCT Pub. No.: WO2018/007143
PCT Pub. Date: Jan. 11, 2018

(65) Prior Publication Data
US 2019/0203757 A1    Jul. 4, 2019

(30) Foreign Application Priority Data
Jul. 8, 2016   (DE) .................. 102016112567.9

(51) Int. Cl.
*F16B 31/02*   (2006.01)
*F16B 37/14*   (2006.01)
*F16B 1/00*    (2006.01)

(52) U.S. Cl.
CPC .............. *F16B 31/02* (2013.01); *F16B 37/14* (2013.01); *F16B 2001/0035* (2013.01)

(58) Field of Classification Search
CPC ...... F16B 1/0071; F16B 31/02; F16B 31/028; F16B 31/04; F16B 31/043; F16B 37/14; F16B 2001/0035; B25B 29/02
(Continued)

(56) References Cited

U.S. PATENT DOCUMENTS 1,388,363 A * 8/1921 Miller .................... B25C 1/082
                                                                 114/51
4,484,132 A    11/1984 Crites
(Continued)

FOREIGN PATENT DOCUMENTS

DE   102010001144 A1   7/2011
DE   102013218845 A1   3/2015
(Continued)

*Primary Examiner* — Roberta S Delisle
(74) *Attorney, Agent, or Firm* — Laubscher & Laubscher, P.C.

(57) ABSTRACT

An attachment for monitoring a nut of a screw connection for crack formation, deformation, and/or breakage includes a socket portion which is attached to the outer circumference of the nut and has a conductor which is interrupted in the case of a deformation, crack, or breakage of the nut. The conductor is embedded in at least one material. The attachment is produced by injection molding with the conductor embedded within the socket portion. The monitoring attachment is particularly useful for operating a shutoff device for a wind generator in the event of failure of a nut which secures a turbine blade to the generator hub.

22 Claims, 4 Drawing Sheets

(58) Field of Classification Search
USPC .......................................................... 411/8, 14
See application file for complete search history.

(56) References Cited

U.S. PATENT DOCUMENTS

| | | | |
|---|---|---|---|
| 5,222,399 A * | 6/1993 | Kropp | F16B 31/028 |
| | | | 177/210 R |
| 6,378,384 B1 * | 4/2002 | Atkinson | G01L 1/2231 |
| | | | 73/862.474 |
| 9,933,004 B2 * | 4/2018 | Ceney | F16B 31/028 |
| 2010/0139413 A1 | 6/2010 | Herrmann et al. | |
| 2019/0277321 A1 * | 9/2019 | McCullough | F15B 15/1428 |

FOREIGN PATENT DOCUMENTS

| | | |
|---|---|---|
| EP | 0511343 B1 | 7/1994 |
| JP | 2015128722 A | 9/2015 |
| WO | 2009003853 A2 | 1/2009 |

\* cited by examiner

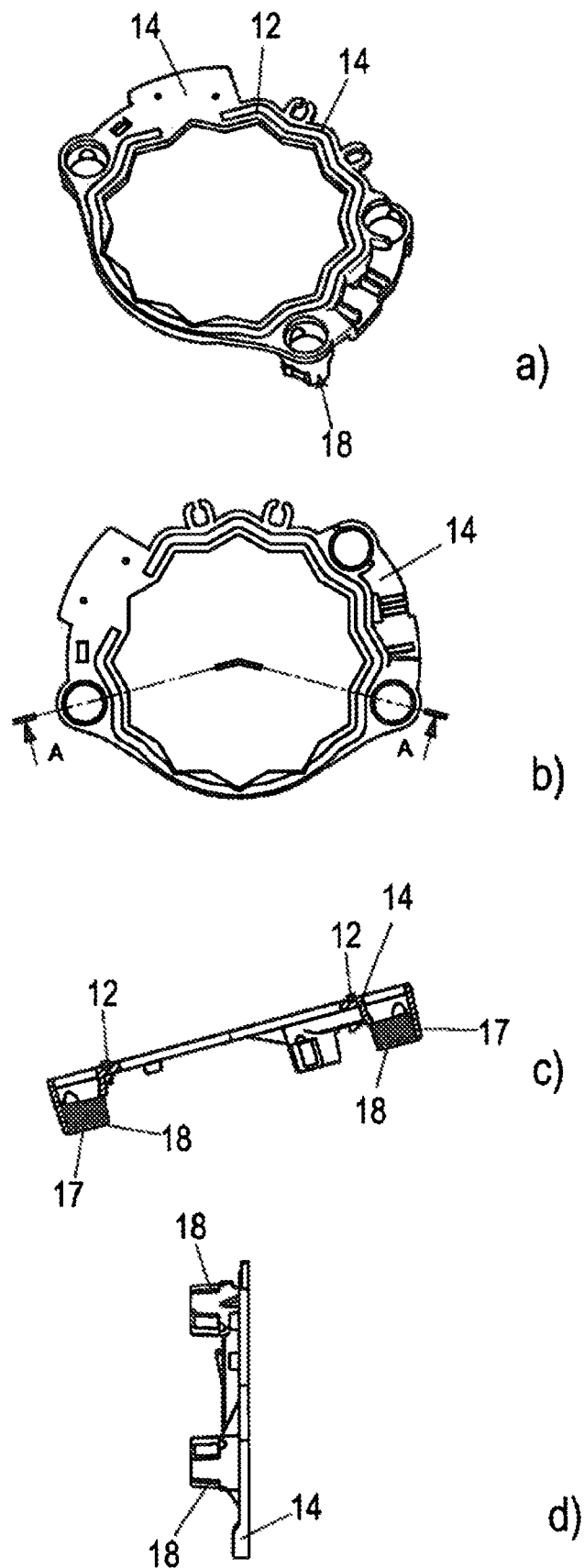

NUT INTEGRITY MONITORING DEVICE AND METHOD

This application is a § 371 of PCT/EP2017/065075 filed Jun. 20, 2017. PCT/EP2017/065075 claims priority of DE 10 2016 112 567.9 filed Jul. 8, 2016 and DE 10 2017 113 376.3 filed Jun. 19, 2017. The entire contents of these applications are incorporated herein by reference.

BACKGROUND OF THE INVENTION

A nut integrity monitoring device is in the form of an attachment for a nut of a screw connection. The attachment is arranged on the nut and detects the formation of cracks, deformations, or breakage of the nut. The invention is also directed to a method for making and using the nut monitoring attachment.

BRIEF DESCRIPTION OF THE PRIOR ART

DE 10 2013 218 845 A1 discloses a monitoring attachment for monitoring a nut for the formation of cracks. The attachment has a socket portion for encompassing the nut. In an alternative embodiment, a conductor is applied to the socket portion. The surface of the socket portion is provided with a lacquer. While the monitoring of a nut using this device has proven valuable in and of itself, it still possesses certain drawbacks.

SUMMARY OF THE INVENTION

Accordingly, it is a primary object of the present invention to achieve a better connection between the circuit track and the socket portion of prior monitoring attachments.

The attachment monitors a nut of a screw connection for crack formation, deformation, and/or breakage. It has a socket portion that can be placed on the outer circumference of the nut and a conductor that is interrupted in the case of deformation, crack formation or breakage of the nut. The conductor is embedded in at least one material that is a different material from the material of the conductor.

The conductor is preferably constructed as an electrical conductor or an optical conductor. In addition, the conductor is integrated or embedded directly in the material, preferably a polymer material, of the socket portion.

The socket portion has a relatively long axial length. However, in a preferred embodiment, it can also have a very short axial length, so that it forms a ring such as an axially short socket portion. This embodiment reduces the space required for installation and the material for the socket and can be made very compact.

The conductor, based on its axial dimension, can be fully or partially embedded in the electrically and/or optically nonconductive material.

In contrast to previously known attachments having a lacquer applied to one side of the conductor, the electrical conductor is embedded in a material, preferably in an electrically nonconductive polymer material, by which a better connection of the conductor to the socket portion and to the monitoring attachment as a whole is achieved. The conductor can be placed directly in the casting mold of the socket portion and have polymer material injected around it. The monitoring attachment is produced in this manner or alternatively using a molded interface device (MID) process. In addition, the conductor is further sealed/protected with a lacquer.

According to an alternative embodiment, one or more magnets may be integrated in the socket portion, especially in the polymer material, which assist with fastening of the sleeve of the socket portion to the component to be monitored. In this manner fastening can be achieved easily and quickly. Then, for example, fastening can be achieved simply in that the socket portion is placed on the nut and the magnet or magnets interact with a ferromagnetic component located beneath the nut.

The electrically and/or optically nonconductive material may be a glass material, a plastic material, a ceramic material, a carbon fiber material, a wood material or a metal material or a composite material made from one or more of these substances. It is preferred that the material is a plastic material, especially a polymer material.

The electrical conductor may be embedded between several areas, especially layers, of one or more material(s), wherein at least one of the material areas is nonconductive.

The monitoring attachment according to the invention monitors a nut of a screw connection for crack formation, deformation and/or breakage. Typical connecting elements of the nut in this process include screws, threaded bolts or threaded rods. The monitoring attachment determines the condition in which the nut is damaged, so that an appropriate signal, for example a warning signal, or a signal for the shutoff mechanism is triggered. When used on a wind generator, the shutoff mechanism then acts on a brake, and preferably also a pitch adjustment for the blades of the wind generator, so that the wind generator is transferred into a secured state.

According to a preferred embodiment of the invention, the monitoring attachment acts as the socket portion with an electrical conductor that can be placed on the outer circumference of the nut. Here, the nut is not part of the monitoring attachment. The socket portion preferably has an inner contour which matches the shape of the nut, at least in portions of its area, so that it can be placed on the nut in a form-fitting manner.

The electrical conductor can be integrated on the socket portion or in the material of the socket portion, and can be interrupted if a deformation, crack formation or breakage of the nut occurs.

In contrast to previously known attachments having a lacquer applied to one side of the conductor, in another embodiment of a monitoring attachment, the electrical conductor is preferably peripherally closed in an electrically nonconductive polymer material, or at least embedded over part of its circumference, so that even better connection of the conductor to the socket portion and to the monitoring attachment is achieved.

Alternatively, in a further embodiment of a monitoring attachment, the electrical conductor may be completely or partially formed of an electrically conductive polymer material.

The socket portion may be formed as an injection-molded interconnect device or have an injection-molded interconnect device. In the first case, the socket portion itself is preferably and simply a so-called MID component. In the second case, a corresponding MID component can be or become attached to the socket portion. In such a case it may, for example, be a polymer film, in which the conductor is embedded, for example as a conductor path, or a molded article, in which the conductor is embedded, for example as a metal wire. The molded article and the polymer film can be connected to the socket portion by polymer welding.

The electrical conductor can advantageously be a multistrand metal wire, e.g., a copper wire or a circuit. In an intermediate step, the circuit can be embedded in the polymer material as a metal track between two passes of an injection molding process. Alternatively, it is also possible to cover a prefinished, preferably ring-shaped circuit board—provided with appropriate circuits—by injection. Alternatively, instead of an electrical conductor, an optical conductor may be used for monitoring, in this case replacing the electrical conductor.

The electrical conductor is preferably embedded in the polymer material as a non-peripherally closed ring or on a non-peripherally closed circuit.

The socket portion can be provided with one or more predetermined breaking points. If multiple predetermined breaking points are provided, these are preferably distributed around the circumference of the socket portion. Advantageously, the predetermined breaking points are arranged in an area of the socket portion in which the electrical conductor is also arranged.

In a preferred alternative embodiment, the socket portion is made in one piece from a single polymer material in which the conductor is embedded and which is arranged on the socket portion. For example, the polymer film may be connected to the socket portion by plastic welding or adhesive bonding or injection molding. The polymer film with the conductor support can be produced as an injection-molded interconnect device.

Preferably, the socket portion has a polygonal interior shape for four-fitting enclosure of the outer circumference of a nut to ensure tight seating.

The monitoring attachment or its webs can have one or more first lugs which mesh into the threads of a screw or a threaded bolt or a threaded rod.

The nonconductive polymer material can be a thermoplastic, and especially advantageously, a polyamide, a polybutylene terephthalate, a polypropylene and/or an acrylonitrile-butadiene-styrene. Copolymers may also be used. The polymer material may also contain additives in order to increase its brittleness, which can be advantageous for solving the current problem. One alternative in this case is the addition of glass fibers.

The electrically conductive polymer material can be formed as a polymer material with electrically conductive additives, especially with metallic additives, Typical examples of this include the addition of metal powder or metal filings to the polymer material, for example 20 to 60 wt.-%/

A simple method for producing the monitoring attachment according to the invention includes supplying an injection molding tool with a cavity for forming the socket portion laying the electrical conductor in the cavity, and injecting an electrically nonconductive polymer material around the conductor to form the socket portion with the electrical conductor embedded therein.

In this manner, the socket portion can be directly used as a monitoring attachment or be supplemented with other components, e.g., a circlip.

Alternatively, in an additional process according to the invention, a first film layer may be supplied in an injection process, a conductor is arranged on the film and covered by injecting a second film layer over it so that a polymer film with an embedded conductor forms. The polymer film can then be integrated into the monitoring attachment during production of the socket portion.

The monitoring attachment can be used for controlling and/or regulating a braking device in a wind generator. The increased electrical resistance that occurs when the circuit is interrupted if the nut is defective can be used as a command signal to release the braking mechanism.

BRIEF DESCRIPTION OF THE FIGURES

Other objects and advantages of the present invention will become apparent from a study of the following description when viewed in the light of the accompanying drawing, in which:

FIG. 6*a*) is a perspective view of an additional embodiment of a monitoring attachment according to the invention;

FIG. 6*b*) is a top view of the monitoring attachment from FIG. 6*a*);

FIG. 6*c*) is a section taken along line A-A in FIG. 6*b*); and

FIG. 6*d*) is a side view of the monitoring attachment from FIGS. 6*a*) to 6*c*).

DETAILED DESCRIPTION

Figure 1:
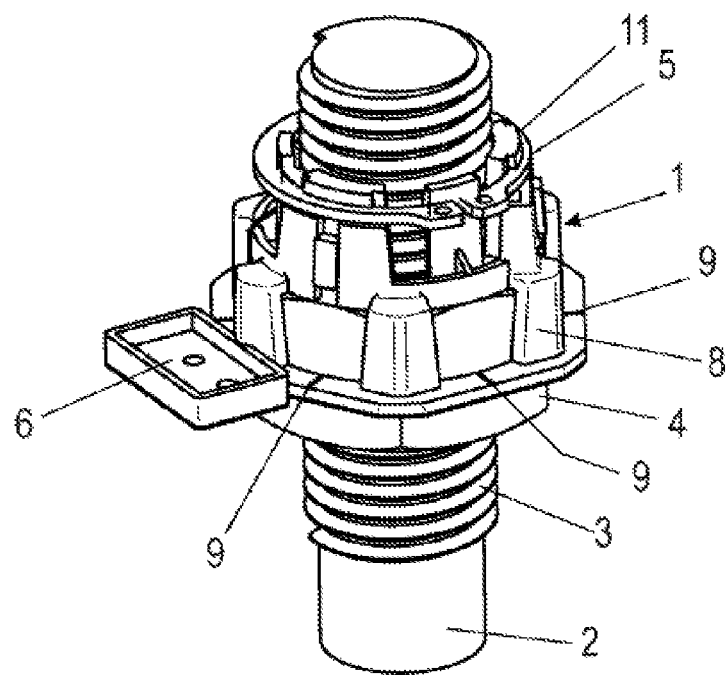
FIG. 1 is a perspective view of an assembly including a screw connection, with a threaded bolt and a nut and a monitoring attachment arranged on the nut.
Figure 2:
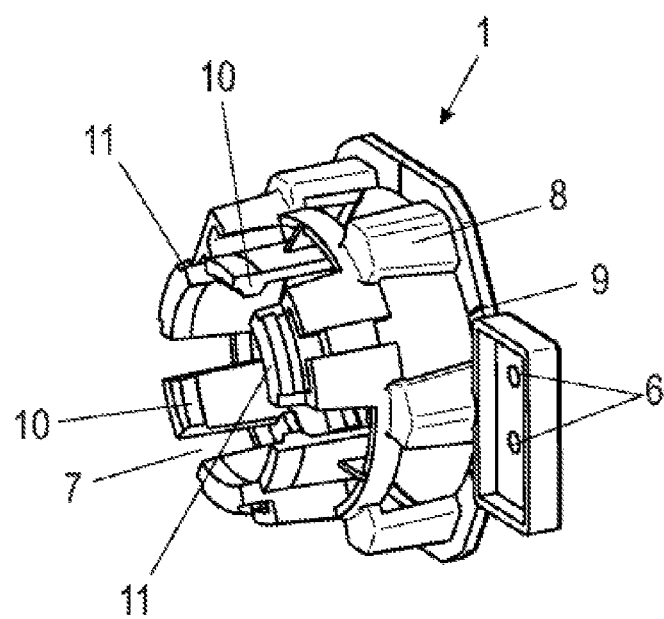
FIG. 2 is a perspective view f the monitoring attachment of FIG. 1.
Figure 3:
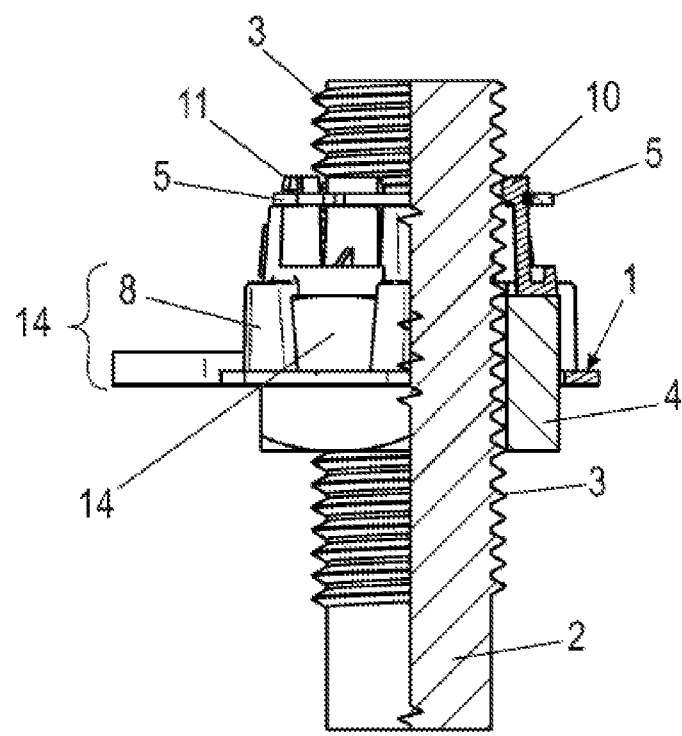
FIG. 3 is a partially cutaway view of the layout of FIG. 1.

FIGS. 1 to 5 show a screw connection with a threaded bolt 2 which for example can be used on a flange connection for fastening a rotor blade to a rotor hub of a wind generator. The threaded bolt 2 is connected to a nut 4, which meshes with a thread 3 of the threaded bolt 2 over an internal thread of which the details are not shown.

The nut 4 is encased or surrounded at least in some areas by a monitoring attachment 1 according to the invention.

The monitoring attachment 1 has a socket portion 14 which has a central longitudinal axis and an inner region for receiving the nut 4. The socket portion 14 has a peripherally closed first partial area and a second partial area that is divided into several webs 10 and 11. These webs 10, 11 are located on a common virtual circular path. Between the webs 10, 11, recesses 7 are arranged, so that the webs 10, 11 are only fixed on one side and return to their normal positions if they are moved radially out of their common circular path.

The socket portion 14 is formed of a plastic or polymer material. This can be a thermoplastic polymer material.

The ends of the webs 10, 11 have lugs. The lugs of a number of first webs 10 project outward radially to the longitudinal axis from the surface of the webs 10. The lugs of a number of second webs 11 project radially outward from the surface of the lugs 11 from the longitudinal axis.

The first webs 10 engage with the threads 3 of the threaded bolt 2 and enable axial locking of the monitoring attachment 1 against the threaded bolt 2.

The lugs of the second webs 11 engage a circlip 5 from behind, which clasp the webs 10, 11 of the monitoring attachment 1 and in this way prevents spreading of the webs 10 and thus loosening of or losing contact of the monitoring attachment 1 with the thread 3 of the threaded bolt 2.

The internal cross sectional area of the sleeve portion 14 essentially corresponds to the external cross section of the nut 4. If the external cross section is polygonal as in FIG. 1, the internal cross sectional area is correspondingly polygonal and large enough to be placed over the nut 4 in a form-fitting manner.

The nut 4 and the monitoring attachment 1 can be moved together in a helical direction around the longitudinal axis of the threaded bolt. The socket portion 14 of the monitoring attachment 1 has a circumferential protrusion 15 which projects radially outward.

The monitoring attachment 1 has a polygonal, outer contour with multiple corner elements 8. In a preferred embodiment, the attachment has a hexagonal contour with six corners or corner elements.

In addition, the monitoring attachment 1 has one or more predetermined breaking points 9, preferably along the circumferential protrusion 15. As soon as a crack develops in the nut 4, a crack in the monitoring attachment 1 likewise occurs, preferably at the predetermined breaking point 9.

Figure 4:
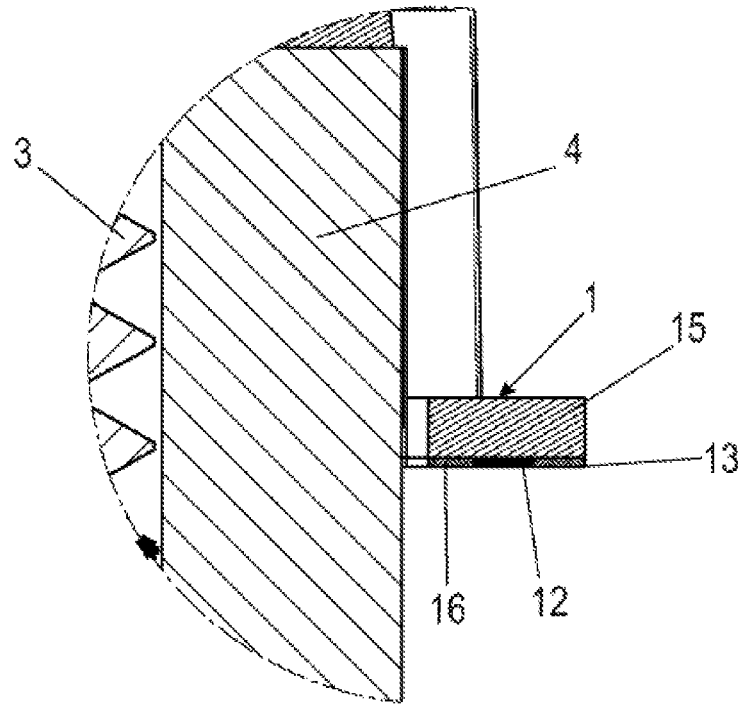
FIG. 4 is a detail view of a partial area of the monitoring attachment of FIG. 3.
Figure 5:
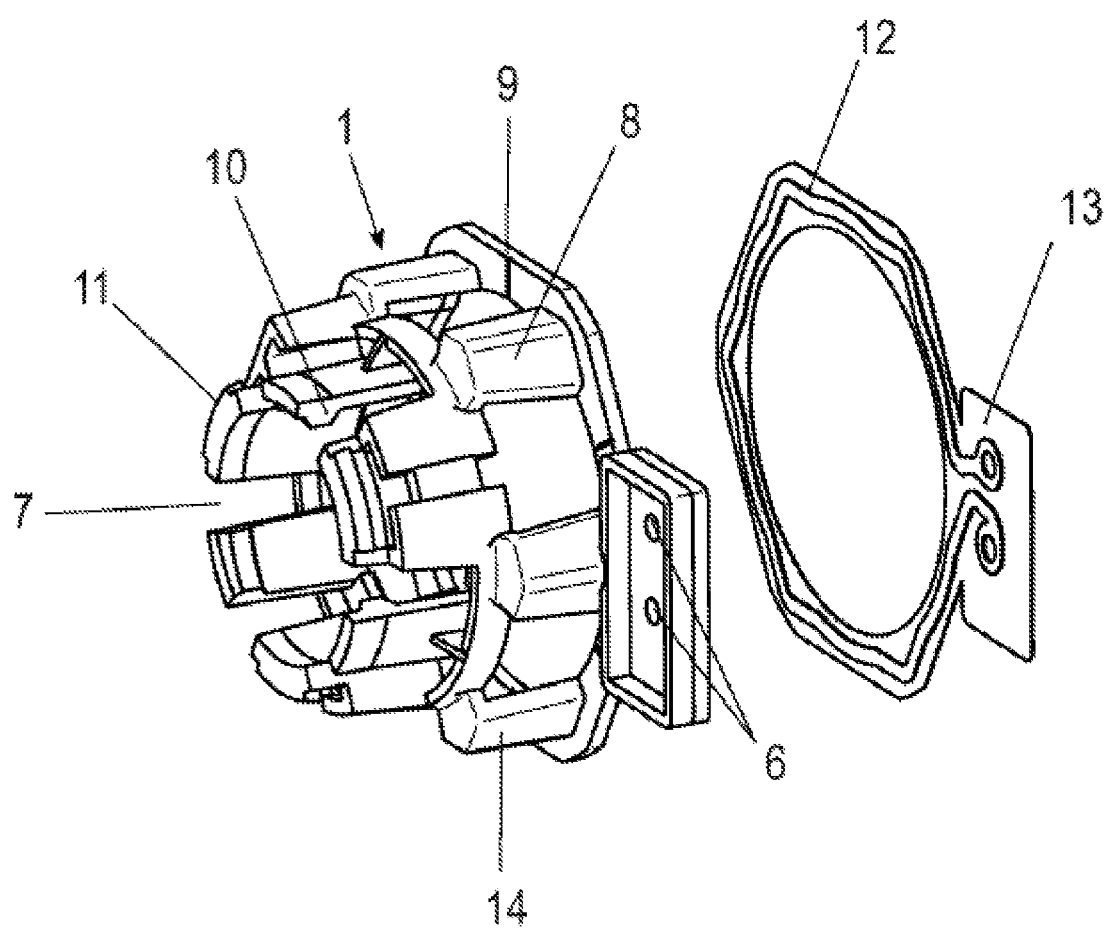
FIG. 5 is an exploded view of the monitoring attachment of FIGS. 1 to 4.

In FIG. 4 it is shown that the monitoring attachment 1 has an electrical conductor 12. In the embodiments of FIGS. 4 and 5, this conductor 12 is embedded in electrically nonconductive polymer material 13 of a polymer film 16.

In the production of the socket portion 14, this polymer film 16 can be laid in an injection molding form, and the socket portion 14 can be formed or completed upon introduction of additional polymer material and simultaneously joined with the polymer film.

As an alternative to the embodiments of a monitoring attachment 1 shown in FIGS. 4 and 5, it is possible to integrate the conductor directly in the polymer material of the socket portion. In this case the conductor can be placed directly in the casting mold of the socket portion and the polymer material can be injected around it. An embodiment of this type is shown in FIG. 6 and will be explained in greater detail below.

In a preferred embodiment of the invention, not shown, an electrical conductor 12, e.g., in the form of a copper wire, can be provided in the area of the protrusion 15 of the monitoring attachment 1.

The conductor 12 may be made of metal wire or as a circuit path. It is also possible to first apply a circuit path on a conductor plate and then inject polymer material around it and therefore embed it.

In FIG. 5, the design of the electrical conductor 12 is shown in further detail. It is located on a non-peripherally closed circular or annular path. The electrical conductor 12 is preferably arranged in a peripherally closed manner, aside from a small piece, e.g., in a corner of the nut. In this process the conductor essentially surrounds the nut, which means that any destruction of the nut will always lead to destruction of the predetermined breaking point 9 of the monitoring attachment. Then destruction of the predetermined breaking point 9 will also result in destruction of the electrical conductor 12.

If the conductor path 12 is interrupted by breakage of the monitoring attachment 1 or at least of the protrusion 15, then a resistance signal, detected by an electronic evaluation unit, will increase rapidly. This is a sign that mechanical integrity of the nut 4 is no longer present and that breakage, deformation or cracking of the nut has occurred.

When the resistance value increases, countermeasures such as actuation of the brake of the wind generator, can be taken.

The polymer material 13 in which the conductor path is embedded protects the conductor path 12 from abrasion and prevents separation of the conductor from the surface in the event of shock or other mechanical or chemical influence which could lead to interruption of the conductor and an unintended increase in resistance.

Thus the polymer material with the electrical conductor can be located on the socket portion 14 or be part of the socket portion 14. In the latter case, the polymer material in which the electrical conductor is embedded is preferably the polymer material of which the entire socket portion 14 is formed.

As an alternative to an embedded conductor, the socket portion can also have an electrically conductive polymer material, which covers almost the entire circumference of the socket portion. This polymer material is only interrupted between first and second contact points 6. At the first of the two contact points 6 a voltage feed or a signal proportional to the voltage can take place, and pick-up of the voltage or the voltage-proportional signal can take place at the second of the two contact points.

Electrical conductivity of the polymer can be achieved by adding metal powder or metal filings of an electrically conductive metal before injection molding. The injection molding of the socket portion with the electrically nonconductive and the electrically conductive polymer material can preferably take place as part of a two-component injection molding process.

The totality of electrical conductor 12 and electrically nonconductive polymer material is particularly preferred as an injection-molded interconnect device, a so-called "Molded Interconnect Device" (MID). This can represent the socket portion 14 of the monitoring attachment 1 or be connected to that. Alternatively, the socket portion and electrical conductor can be manufactured by a three dimensional printer (not shown).

The conductor 12 is arranged on an annular path around the nut 4 and opens at two adjacent contacts 6 in a contact region, to which a cable or other signal lines can be fixed.

The polymer material 13, in contrast to a circuit board, may be made of a thermoplastic. Typically, circuit boards are largely made of a duroplast material.

The production as an injection-molded interconnect device can take place by two-component injection molding, hot embossing, a mask illumination method, laser structuring and/or reverse injection molding.

In two-component injection molding, a plastic forms the polymer matrix 13 having at least two base bodies. A first base body is a plastic body and a second base body is metallizable and holds the conductor 12.

For metallizing, in injection molding, a metallizable, non-electrically conducting plastic is used for the first pass. Then the conductor path geometry of the metal layer is reproduced. In the second pass, the regions between the conductors are filled with a non-metallizable plastic. This method is also known as the PCK method.

Alternatively, in the first pass the conductor can be injected as a depression from the non-metallizable component, and then in a second pass the depressions filled with a metallizable component, After the second pass, the polymer material 13 has its basic form, and then an electrically conductive metal, e.g., copper, is applied to the metallizable plastic. This may be done by galvanization.

In the alternative hot embossing process, a surface-modified metal foil may be embossed using an embossing tool into its conductor geometry and bonded to the injected polymer material 13 using pressure and heat. The embossing foils may be provided with a bonding agent, e.g., an adhesive.

In laser structuring, the so-called laser direct structuring (LDS) method may be used, for example, to form depressions in a base part made of plastic using a laser, and then the conductor is embedded.

In reverse injection molding, a single-layer or multi-layer flexible printed circuit can be laid in an injection molding tool and reverse-injected with suitable plastics to form the polymer material.

Preferably the polymer material includes plastics such as polyamide, e.g., PA66, polybutylene terephthalate, acrylonitrile-butadiene-styrene and/or polypropylene, in each case with or without glass fibers.

The screw connections according to the invention may be used wherever high forces act on the mechanical connecting elements. One particular application area for this is the use of the screw connection on the rotor hub of a wind generator.

Wind generators are also often called wind turbines and were described numerous times in the prior art, for example in the textbook "Windkraftanlagen: Grundlagen, Technik, Einsatz, Wirtschaftlichkeit [Wind Generators: Principles, Technology, Use, Efficiency], Erich Hau, Berlin/Heidelberg 2014." A wind power energy generation unit suitable for and combinable with the invention typically has a tower with a foundation and/or an offshore base, an electric system or input, a nacelle, and rotor blades fastened to the nacelle.

In this design the rotor blades are fastened to a rotor hub of a machinery train. This rotor hub is set into rotary motion by wind power and transfers this rotary motion through a transmission to a generator to produce energy. Typically a wind generator also has a brake, e.g., a disk brake, which collects the kinetic energy of the rotor.

Within the housing of a wind generator, the rotor blades are attached to the rotor hub by flange connections.

In the variant of a monitoring attachment 1 according to the invention shown in FIG. 6, the conductor 12, especially the electrical conductor, is embedded directly into the material, especially the polymer material, of the socket portion 14, over part of its circumference—here over about half of its circumference.

In addition, the socket portion 14 has a very short axis—e.g., only a few mm long—so that it forms a ring. A ring is a short socket segment in the context of this description.

Under these circumstances, for production, the conductor 12 can be placed directly into the casting mold for the socket portion 14 and covered by injection with material at least over part of its circumference, especially with the polymer material. A design of this type is shown in FIG. 6a) to FIG. 6d). Here the conductor is embedded in a type of ring at or over a portion of its circumference—for example, over about half of its circumference (FIG. 6c).

Also, one or more magnets 17 is integrated in the polymer material according to FIG. 6; these can be used for fastening the socket portion 14 to the component to be monitored. For example, the magnets 17 can be encased by injection, completely or in sections, with the material of the socket portion 14. They can also be placed in recesses in the socket portion 14, for example in domes 18 protruding axially from the outer portion of the socket, preferably distributed over the circumference.

Fastening can be accomplished in that the socket portion is placed on a nut and the magnets interact with a ferromagnetic component located below the nut.

A particular advantage of this embodiment lies in the fact that in this way, nuts on very short threaded bolts may be monitored, since the socket portion then requires only a very short bolt section for securing it radially.

The invention claimed is:

1. An attachment device for monitoring the integrity of a nut of a screw connection, comprising
    a) a housing including a socket portion which is configured for placement on an outer surface of the nut;
    b) a conductor embedded within a material and connected within said socket portion, whereby said conductor is interrupted if the nut is deformed, cracked, or broken; and
    c) at least one magnet arranged in one of said housing and said material for fastening said housing with the nut.

2. An attachment device as defined in claim 1, wherein said conductor is one of an electrical and optical conductor and said material is non-conductive.

3. An attachment device as defined in claim 2, wherein said material is a polymer material.

4. An attachment device as defined in claim 3, wherein said polymer material is electrically conductive.

5. An attachment device as defined in claim 4, wherein said electrically conductive polymer material is a polymer material containing metal additives.

6. An attachment device as defined in claim 2, wherein said material is one of a glass, ceramic, carbon fiber, wood and metal material.

7. An attachment device as defined in claim 3, wherein said polymer material is one of a polyamide, a polybutadiene terephthalate, a polypropylene an acrylonitrile-butadiene-styrene and a polyetheretherketone.

8. An attachment device as defined in claim 1, wherein said conductor is one of completely and partially embedded within said material in accordance with an axial dimension of said conductor.

9. An attachment device as defined in claim 8, wherein said conductor is embedded in the form of a non-peripherally closed ring.

10. An attachment device as defined in claim 1, wherein said material comprises a plurality of layers of material, at least one of which is nonconductive.

11. An attachment device as defined in claim 1, wherein said socket portion is formed as an injection molded interconnection device.

12. An attachment device as defined in claim 1, wherein at least one of said socket portion and said conductor is formed in a three-dimensional printer.

13. An attachment device as defined in claim 1, wherein said conductor is formed of one of a metal wire and a circuit.

14. An attachment device as defined in claim 1, wherein said socket portion contains at least one break point.

15. An attachment device as defined in claim 1, wherein said socket portion is formed as a unitary structure of polymer material in which said conductor is embedded.

16. An attachment device as defined in claim 1, wherein material comprises at least one layer of nonconductive polymer film in which said conductor is embedded, said polymer material being arranged on said socket portion.

17. An attachment device as defined in claim 16, wherein said polymer film comprises an injection molded interconnection device.

18. An attachment device as defined in claim 1, wherein said socket portion has an in internal geometric configuration which matches an external geometric configuration of the nut.

19. An attachment device as defined in claim 1, wherein said housing includes at least one lug which engages in the threads of a screw or bolt of the screw connection.

20. An attachment device as defined in claim 1, wherein said socket portion is configured as a ring.

21. A method for forming an attachment device as defined in claim 1, comprising the steps of
   (a) supplying an injection mold with a cavity;
   (b) placing said electrical conductor in said cavity; and
   (c) injecting said cavity with an electrically nonconductive polymer material for form said socket portion with said electrical conduct embedded therein.

22. A method for using an attachment device as defined in claim 1 to control a shutoff device in a wind generator in response to deformation, cracking or breaking of the nut.

\* \* \* \* \*